United States Patent
Kim et al.

(10) Patent No.: US 11,740,687 B2
(45) Date of Patent: Aug. 29, 2023

(54) VARIABLE POWER MODE INFERENCING

(71) Applicant: Western Digital Technologies, Inc., San Jose, CA (US)

(72) Inventors: Yongjune Kim, San Jose, CA (US); Cyril Guyot, San Jose, CA (US); Won Ho Choi, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 328 days.

(21) Appl. No.: 16/854,677

(22) Filed: Apr. 21, 2020

(65) Prior Publication Data

US 2021/0325957 A1    Oct. 21, 2021

(51) Int. Cl.
| | |
|---|---|
| *G06F 1/26* | (2006.01) |
| *G06F 1/32* | (2019.01) |
| *G06F 1/3296* | (2019.01) |
| *G06N 3/08* | (2023.01) |
| *G06N 3/04* | (2023.01) |

(52) U.S. Cl.
CPC ............. *G06F 1/3296* (2013.01); *G06N 3/04* (2013.01); *G06N 3/08* (2013.01)

(58) Field of Classification Search
CPC ....... G06F 1/3296; G06F 1/3206; G06N 3/04; G06N 3/08; G06N 3/0481; G06N 3/0635; Y02D 10/00
See application file for complete search history.

(56) References Cited

U.S. PATENT DOCUMENTS

| | | | |
|---|---|---|---|
| 8,953,841 B1* | 2/2015 | Leblang | G06V 20/20 382/103 |
| 2015/0106089 A1* | 4/2015 | Parker | G10L 25/48 704/E15.005 |
| 2019/0087690 A1* | 3/2019 | Srivastava | G06F 1/3296 |
| 2019/0147344 A1 | 5/2019 | Zhang et al. | |
| 2019/0228051 A1 | 7/2019 | Langhammer et al. | |

(Continued)

FOREIGN PATENT DOCUMENTS

| | | |
|---|---|---|
| DE | 102017117381 A1 | 2/2018 |
| WO | 2019104228 A1 | 5/2019 |

OTHER PUBLICATIONS

Arash, Ardakani et al.; "Multi-Mode Inference Engine for Convolutional Neural Networks"; ArXiv 2017, Computer Science; https://arxiv.org/pdf/1712.03994.pdf; Dec. 11, 2017 (12 pages).

(Continued)

*Primary Examiner* — Xuxing Chen
(74) *Attorney, Agent, or Firm* — Patterson + Sheridan, LLP; Steven H. VerSteeg

(57) ABSTRACT

Certain aspects of the present disclosure provide a method for performing multimode inferencing, comprising: receiving machine learning model input data from a requestor; processing the machine learning model input data with a machine learning model using processing hardware at a first power level to generate first output data; selecting a second power level for the processing hardware based on comparing the first output data to a threshold value; processing the machine learning model input data with the machine learning model using the processing hardware at the second power level to generate second output data; and sending second output data to the requestor.

20 Claims, 9 Drawing Sheets

(56) References Cited

U.S. PATENT DOCUMENTS

2019/0325305 A1 10/2019 Zhang et al.
2020/0265336 A1* 8/2020 Merrill .................. G06N 20/20

OTHER PUBLICATIONS

Brand, Haim et al.; "Fast Inference with Early Exit" Intel AI; https://www.intel.ai/fast-inference-with-early-exit/#gs.hk6h2u; Nov. 22, 2019 (9 pages).

Intel AI, Nervana; "Built to Accelerate Intense Multimodal Inferencing from Network Edge to Cloud"; Product Brief; https://simplecore.intel.com/ai/wp-content/uploads/sites/69/16433-1_NNP-announce_NNP-I_brief_v5.1.pdf (2 pages).

Marchisio, Alberto et al.; "CapStore: Energy-Efficient Design and Management of the On-Chip Memory for CapsuleNet Inference Accelerators"; ArXiv: 1902.01151v2; https://arxiv.org/pdf/1902.01151.pdf (7 pages).

Han, Song; "EIE: Efficient Inference Engine on Compressed Deep Neutral Network" ACM/IEEE 43rd Annual International Symposium on Computer Architecture; IEEE Computer Society, 2016, pp. 243-254.

Sudarshan, Chirag et al.; "An In-DRAM Neural Network Processing Engine"; IEEE International Symposium on Circuits and Systems, 2019, http://sci-hub.tw/https://ieeexplore.ieee.org/document/8702458, 2019 (5 pages).

Deng, Quan et al; "DrAcc: a DRAM based Accelerator for Accurate CNN Inference"; Association for Computing Machinery, http://sci-hub.tw/https:/dl.acm.org/citation.cfm?id=3196029; 2018 (6 pages).

Amazon, "Amazon Elastic Interface" Tech Talk; https://aws.amazon.com/machine-learning/elastic-inference/, 2018 (6 pages).

Chen, Yu-Hsin et al; "Eyeriss: An Energy-Efficient Reconfiguable Accelerator for Deep Convolutional Neural Networks" IEEE Journal of Solid-State Circuits, https://people.csail.mit.edu/emer/papers/2017.01.jssc.eyeriss_design.pdf; 2017 (12 pages)).

* cited by examiner

VARIABLE POWER MODE INFERENCING

INTRODUCTION

This disclosure generally relates to machine learning, and in particular to variable power mode machine learning models for energy-efficient inferencing.

Machine learning generally relates to algorithms and statistical models used to perform a specific task without using explicit instructions, relying instead on patterns and inference instead. While versatile and powerful, machine learning models often require significant compute resources to perform optimally, which in-turn requires significant power. High power usage for processing systems connected to mains power is primarily an efficiency issue, but high power usage in other sorts of processing systems, such as mobile devices and other edge processing devices, is a threshold functional issue. Unfortunately, the high power demands of conventional machine learning models may limit or prevent entirely their deployment to mobile devices and other low-power edge processing devices, which represent the next frontier of data processing for many applications.

Accordingly, what is needed are systems and methods for improving the energy efficiency of machine learning tasks, such as inferencing.

BRIEF SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

A first aspect of this disclosure provides a method for performing multimode inferencing, comprising: receiving machine learning model input data from a requestor; processing the machine learning model input data with a machine learning model using processing hardware at a first power level to generate first output data; selecting a second power level for the processing hardware based on comparing the first output data to a threshold value; processing the machine learning model input data with the machine learning model using the processing hardware at the second power level to generate second output data; and sending second output data to the requestor.

Another aspect of this disclosure provides a processing system for performing multimode inferencing, comprising: a memory comprising computer-executable instructions; one or more processors configured to execute the computer-executable instructions and cause the processing system to: receive machine learning model input data from a requestor; process the machine learning model input data with a machine learning model using processing hardware at a first power level to generate first output data; select a second power level for the processing hardware based on comparing the first output data to a threshold value; process the machine learning model input data with the machine learning model using the processing hardware at the second power level to generate second output data; and send second output data to the requestor.

A further aspect of this disclosure provides a processing system for performing multimode inferencing, comprising: means for receiving machine learning model input data from a requestor; means for processing the machine learning model input data with a machine learning model using processing hardware at a first power level to generate first output data; means for selecting a second power level for the processing hardware based on comparing the first output data to a threshold value; means for processing the machine learning model input data with the machine learning model using the processing hardware at the second power level to generate second output data; and means for sending second output data to the requestor.

Further aspects provide non-transitory computer readable media comprising instructions that, when executed by one or more processors of a processing system, perform the aforementioned methods as well as those further described herein.

Further aspects provide a computer program product embodied on a computer readable storage medium comprising code for performing the aforementioned methods as well as those further described herein.

The following description and the related drawings set forth in detail certain illustrative features of one or more embodiments.

BRIEF DESCRIPTION OF THE DRAWINGS

The accompanying drawings depict certain aspects of the one or more embodiments and are therefore not to be considered limiting of the scope of this disclosure.

Figure 1A:
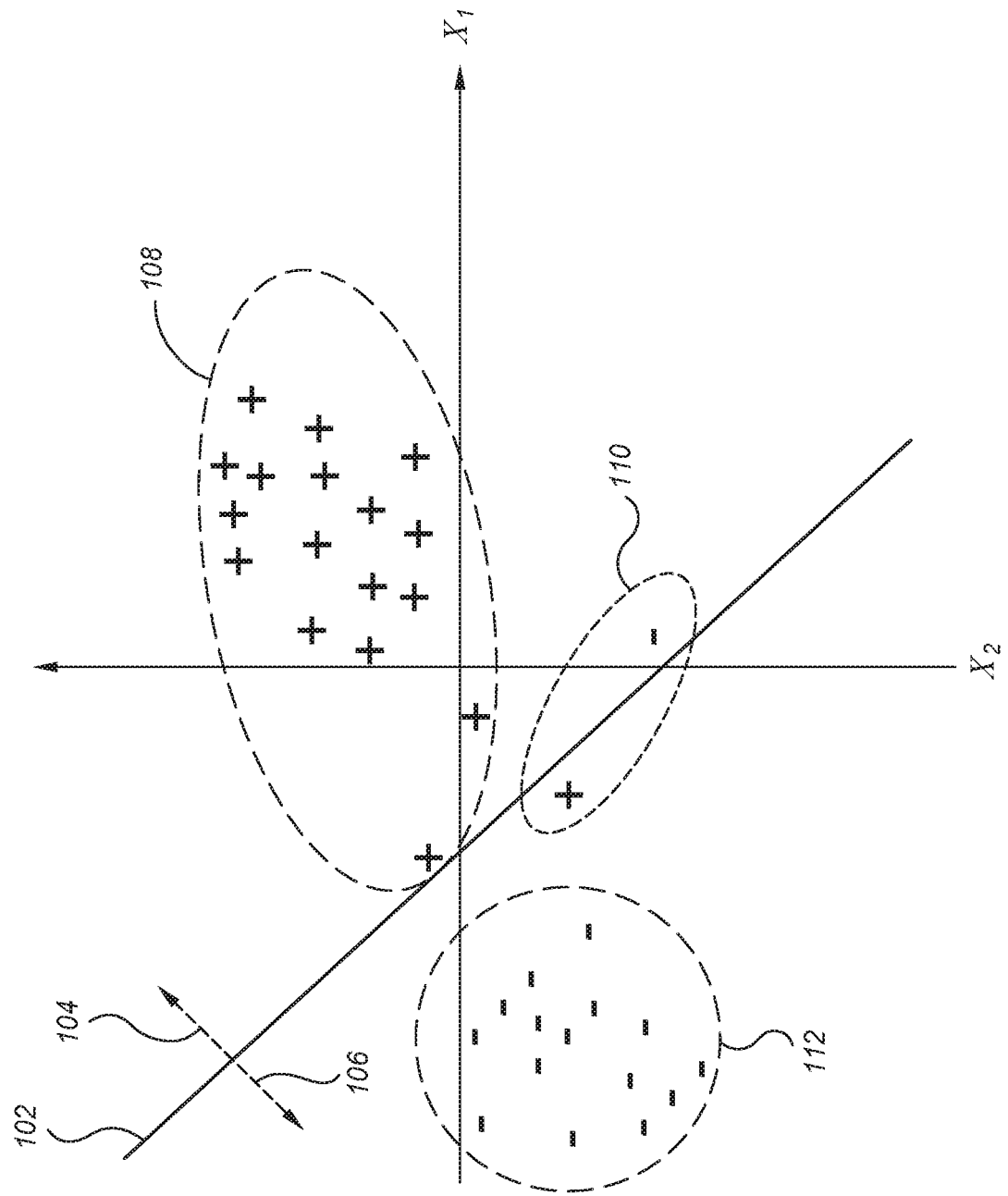
FIGS. 1A-1D depict an example of performing multimode inferencing for a binary classification model.

In the following detailed description, reference is made to the aforementioned drawings, which form a part thereof. In addition to the illustrative aspects, embodiments, and features depicted in the aforementioned drawings, further aspects, embodiments, and features will become apparent by reference to the drawings and the following detailed description. The description of elements in each figure may refer to elements of proceeding figures. Like numbers may refer to like elements in the figures, including alternate embodiments of like elements.

DETAILED DESCRIPTION

Aspects of this disclosure relate to systems and methods for implementing variable power mode machine learning models, which improve the energy-efficiency of machine learning tasks, such as inferencing.

Overview

Conventional machine learning model design requires a tradeoff between performance (e.g., in terms of accuracy of the model for classification tasks) and power efficiency. Consequently, high performance machine learning models have traditionally be trained and deployed to high-power processing systems, while lower performance machine learning models have been trained and deployed to less powerful processing systems, such as battery-powered mobile devices (e.g., smartphone and tablet computers), wearable devices (e.g., smart watches or smart glasses), internet of things (IoT) devices (e.g., distributed sensors), edge processing devices, and the like.

With an increasing amount of data processing "moving to the edge", there is a need for high performance, but energy efficient, machine learning models for less powerful processing systems. Accordingly, to improve upon conventional machine learning model design tradeoffs, embodiments described herein employ machine learning models capable of processing data in multiple power modes. By selectively using lower power processing modes for certain input data and higher power processing modes for other input data, improved performance and power efficiency can be achieved simultaneously over aggregated operations, such as inferencing. Notably, unlike other solutions, the embodiments described herein offer the dual benefits of improved performance and improved power efficiency without changing the underlying model architecture between or during processing operations. In particular, embodiments described herein implement multiple power modes for inferencing using the same model in all power modes. Efficiency is improved by using the lowest processing power mode necessary for an inference, and only using an increased processing power mode when an inference at a lower power mode is not sufficiently reliable.

For example, in one embodiment of multiple processing power mode (or multimode) inferencing, a low-power inference mode is used for an initial inference operation on a set of input data. When the result of the initial inference is reliable, such as when it exceeds a confidence threshold, then the result is used and power is saved by virtue of avoiding a higher power inference mode. When the initial inference is unreliable, such as when it falls below a confidence threshold, then a higher power inference mode is used on the same input data and using the same model to generate a more reliable inference. Because the frequency of reliable inferences is generally higher than that of unreliable inferences for a well-trained model, the aggregate effect of multiple inference operations using the multimode inference strategy is improved power efficiency, even when some input data are processed in more than one processing power mode.

Certain embodiments described herein use two power modes for inferencing, such as a high-power inferencing mode and a low-power inferencing mode, and thus may be referred to generally as dual-mode inferencing embodiments. Other embodiments may use more than two power modes for performing machine learning tasks, such as inferencing.

In some embodiments, multimode inferencing can be implemented by selecting different supply voltages for processing hardware in a processing system implementing a machine learning model for each inferencing mode. For example, the processing system may include a dynamic power supply controller configured to alter the power supply voltage to processing hardware configured for performing machine learning tasks, such an array of processing elements configured for machine learning operations. Changing the voltage changes the power used by the processing system because power usage is generally proportional to the square of the operating voltage of the processing hardware. In some cases, the processing elements may be a part of a dedicated machine learning task accelerator (e.g., an inference accelerator), or another type of processing unit, such as a central processing unit (CPU), graphics processing unit (GPU), a tensor processing unit (TPU), or any other sort of processing subsystem configured for machine learning tasks.

Notably, the multimode inferencing described herein improves upon conventional low-power machine learning techniques in several important aspects. For example, conventionally, an entirely different machine learning model may be used for inferencing on low-power processing systems as compared to high-power processing systems. Unfortunately, conventional models optimized for lower power, such as by reducing the size of the model, or disabling portions of the model, tend to have concomitantly lower performance, and thus their performance is inherently compromised by their low-power design. By contrast, embodiments described herein use a single model that is capable of being used in multiple power and performance modes, such as lower power/lower performance and higher power/higher performance, without changing the underlying model architecture and without disabling or skipping elements of the model. Thus, the embodiments described herein maintain higher performance while achieving improved energy efficiency.

Embodiments described herein are able to achieve higher performance and improved energy efficiency simultaneously by evaluating the reliability of model output in a lower power processing mode and only utilizing a higher power/higher performance processing mode when the output is not sufficiently reliable. The evaluation of the model output allows for using a higher power mode only when necessary, which maintains overall model performance, and for using lower power modes whenever possible, which improves energy efficiency.

For example, in a classification task, a lower power/lower performance mode may return a less accurate probability of a classification, but so long as the probability is reliable enough to make the classification, the model may nevertheless return the correct classification without entering a higher power mode. Thus, a higher power/higher performance probability calculation is not always necessary to achieve the correct classification.

Multimode inferencing further improves upon conventional low-power machine learning techniques in that only a single model needs training and deploying as compared to the conventional practice of training and deploying multiple different models for different device capabilities. Thus, embodiments described herein avoid the significant resource costs of training multiple models for different devices and power implementations.

Further, deploying a single multimode inferencing model to a processing system saves valuable memory space on the processing system, such as by the avoidance of loading multiple sets of model parameters, which allows the saved memory space to be used for other useful purposes. For lower power devices, such as mobile and edge processing devices, reducing the memory requirements of machine learning models may also beneficially result in smaller form factors, reduced overall power usage, and improved battery life.

Example Multimode Inferencing for Binary Classification Model

FIGS. 1A-1D depict an example of performing multimode inferencing for a binary classification model. For purposes of this example, a dual-mode inferencing scheme is described with a lower power/lower performance inferencing mode and a higher power/higher performance inferencing mode. However, other embodiments may utilize additional power modes.

FIG. 1A depicts an example of a binary classification model with a learned classification boundary line 102. All observations on the side of classification boundary line 102 in the direction of arrow 104 are classified by the model as a first class ("positive" in this example), and all observations in the direction of arrow 106 are classified by the model as a second class ("negative" in this example). Each observation is indicated as its correct class by a positive or negative sign.

The binary classifier in this example may be based on a linear classification model, $y=\text{sign}(f(x))=\text{sign}(w_1x_1+w_2x_2+b)$, where the classification boundary line 102 exists at $w_1x_1+w_2x_2+b=0$. In this example, the weights $w_1$ and $w_2$ and the intercept b of the two-dimensional classification may be trained by machine learning. Notably, in other examples, the classification boundary line 102 may be more complex and take on shapes other than a straight line, such as a non-linear classification (or decision) boundary.

In this example, the classification model has correctly classified all of the positive observations in group 108 and all of the negative observations in group 112. However, the classification model has incorrectly classified the observations in group 110. In other words, the negative observation in group 110 is on the positive side of classification boundary line 102 and thus would be classified as positive by the model. Similarly, the positive observation in group 110 is on the negative side of classification boundary line 102 and thus would be classified as negative by the model.

Figure 1B:
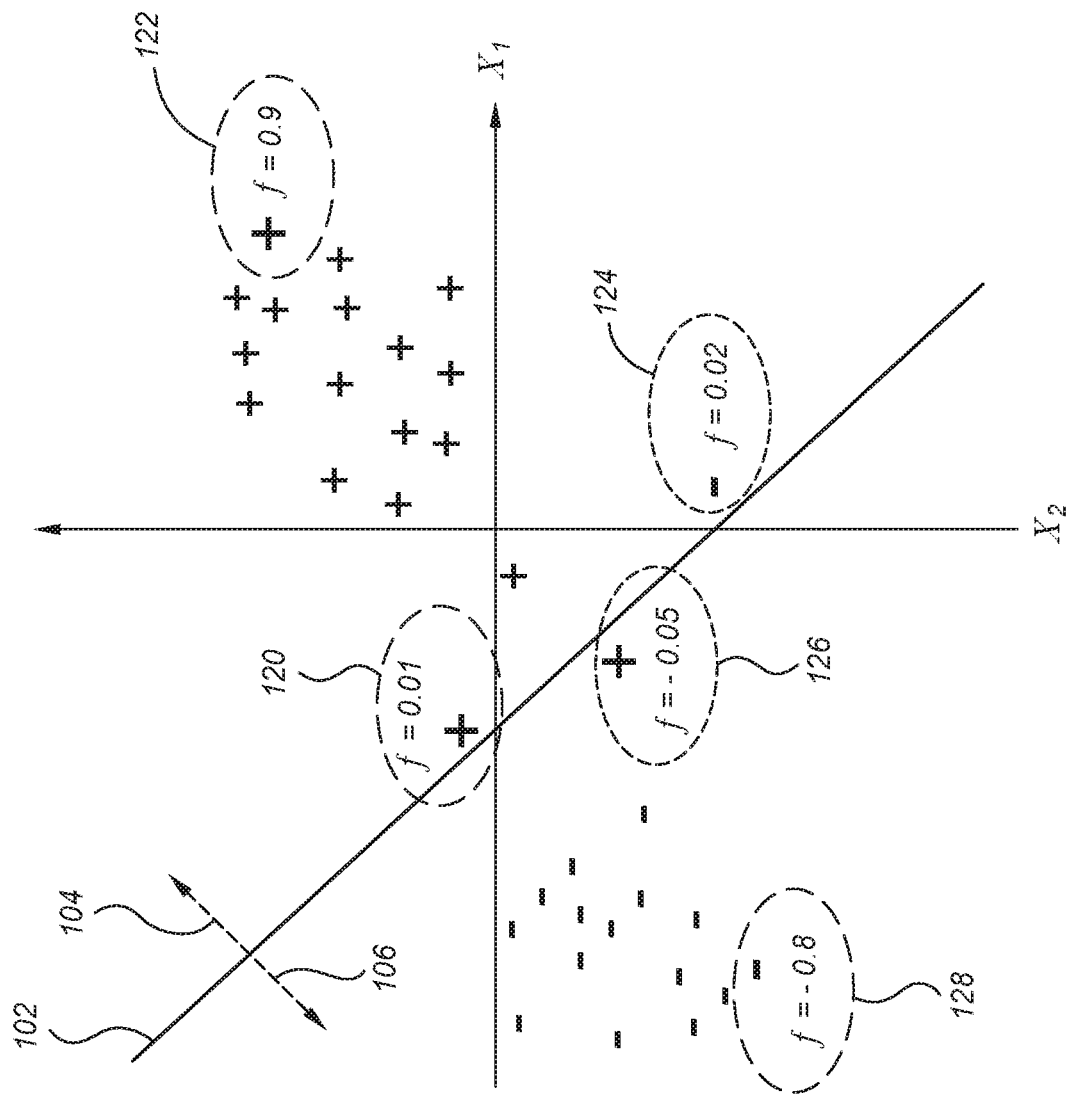

FIG. 1B highlights selected observations from the observations depicted in FIG. 1A. While in this example the classification model predicts the class of an observation (e.g., positive or negative) based on the sign of the model output and not the magnitude of the model output, there is nevertheless an apparent relationship between the magnitude of the model output and the likelihood of a misclassification.

For example, observations 122 and 128 have model output values ($f(x)=0.9$ and $-0.8$, respectively) that are relatively far from the sign decision boundary value of 0. By contrast, misclassified observations 124 and 126 have model output values ($f(x)=0.02$ and $-0.05$, respectively) that are relatively close to the sign decision boundary value of 0. Thus, a model output error of 0.1 could easily "flip" misclassified observations 124 and 126 from a correct class to an incorrect class, or vice versa, whereas the same model error would not change the classification of observations 122 and 128.

Observation 120 is correctly classified as positive in this example with an output value $f(x)=0.01$, but here again, a very small model output error could easily flip the classification of observation 120 to the wrong class.

Figure 1C:
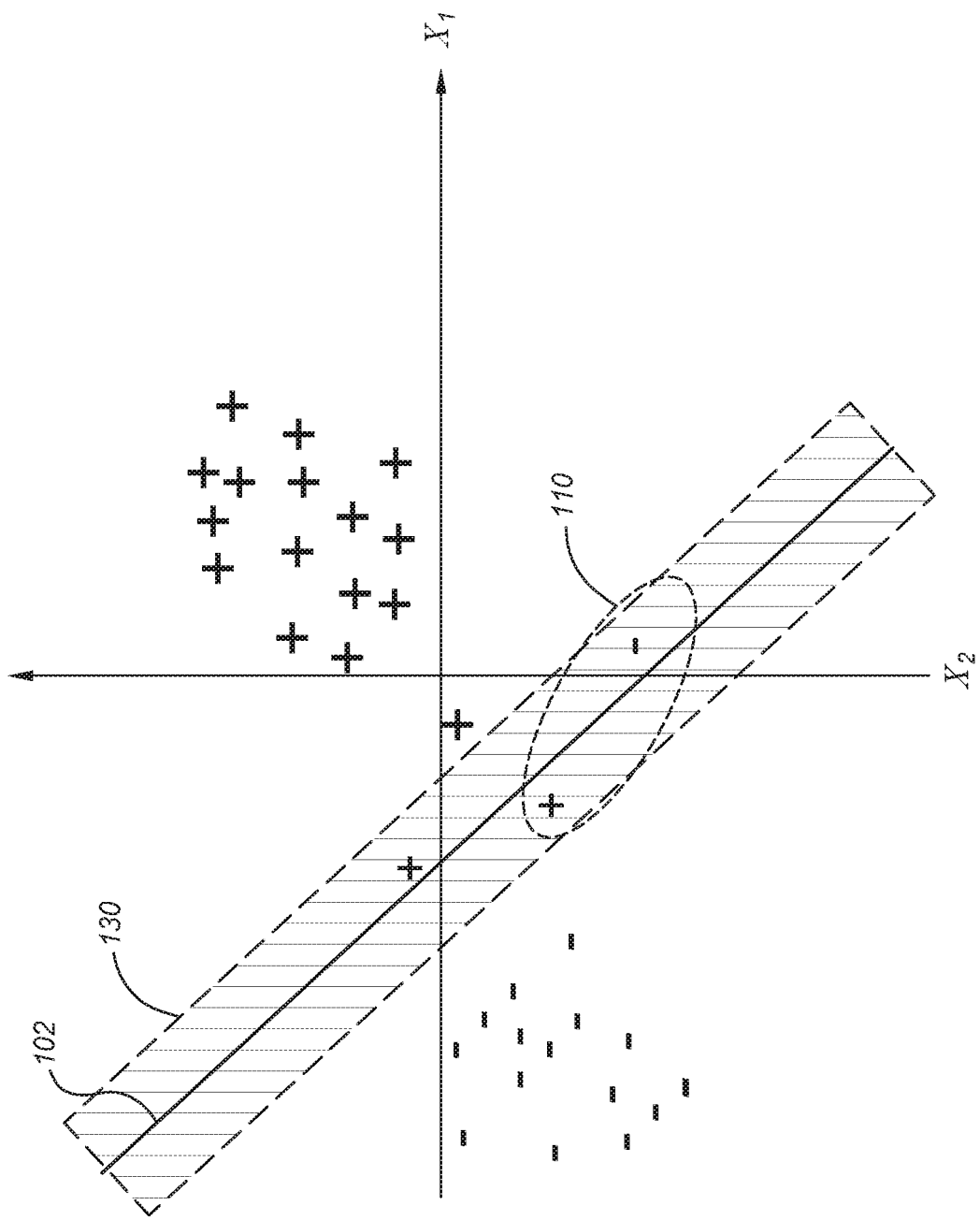

FIG. 1C depicts an example area of uncertainty (or low confidence) 130 in which classifications of observations may be considered relatively unreliable. Stated differently, the observations (e.g., input data) within area 130 may be considered relatively more difficult to classify correctly. In this example, area 130 is based on an error range on either side of classification boundary line 102, such as an error of +/−0.07 from any point on the decision boundary in this example. Observations outside of area 130 may be relatively easier to classify correctly, and classifications of observations falling outside of area 130 may be considered relatively reliable. The misclassified observations in group 110 fall within area of uncertainty 130.

Notably, area of uncertainty 130 is just one example, and many others are possible. In other embodiments, the area of uncertainty may be a more complex shaped area, such as a non-linearly shaped area. The area (or volume) of uncertainty may also be more than two dimensional in other examples based on the dimensionality of the underlying model.

Figure 1D:
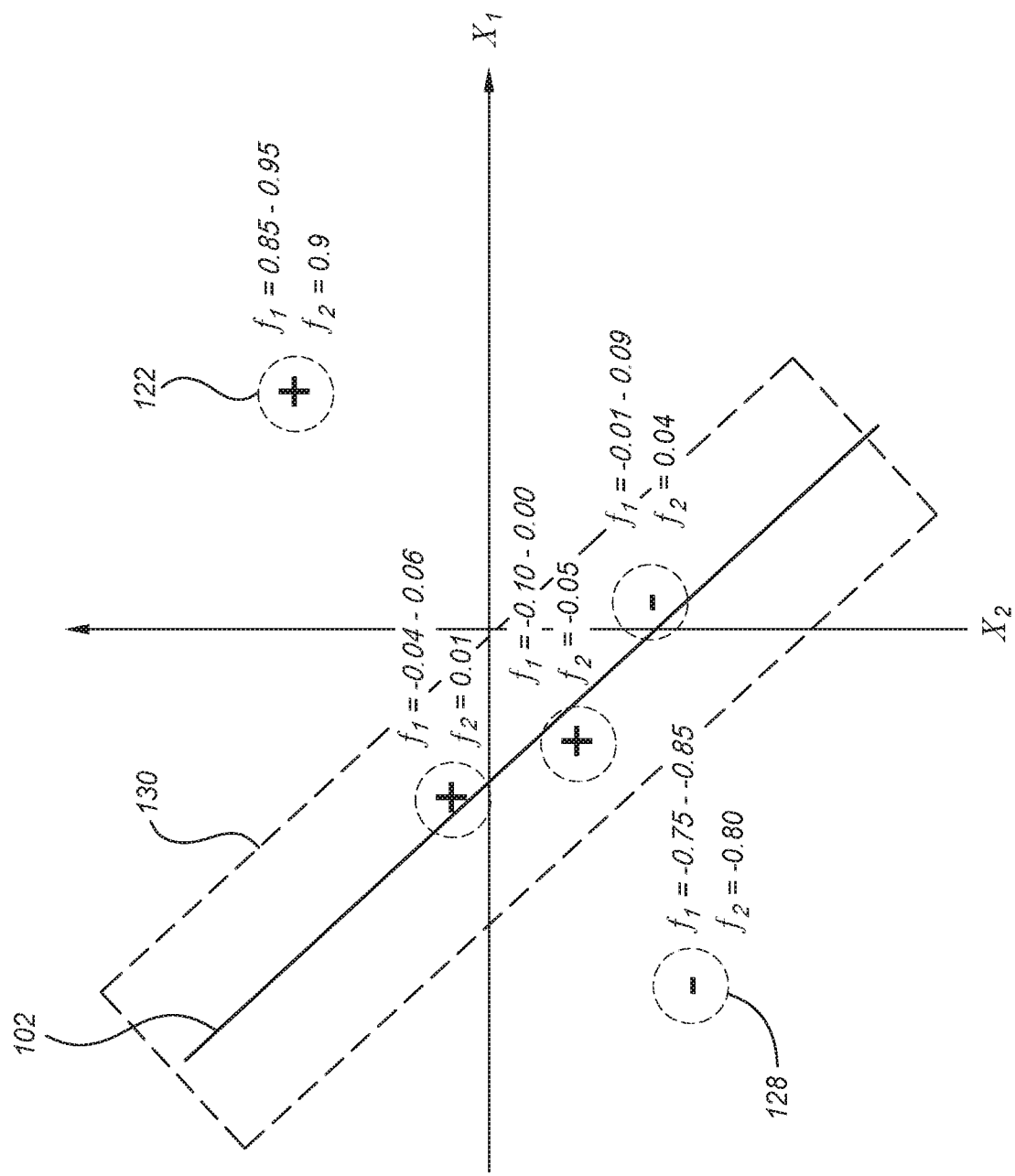

FIG. 1D depicts an example of using two different power modes (e.g., inferencing modes) for the binary classification model. In particular, a first, lower power mode for the prediction model results in classifications with lower performance (e.g., lower accuracy and/or more uncertainty) via $f_1(x)$, while a second, higher power mode for the prediction model results in classifications with higher performance (e.g., higher accuracy and/or less uncertainty) via $f_2(x)$. In FIG. 1D, uncertainty with respect to $f_1(x)$ is indicated by a dotted circular boundary around an observation, e.g., observation 122.

Notably, observations 122 and 129 have model output magnitudes that are not near the classification boundary line 102, and thus generate the same classification result (in terms of sign) for both the lower power mode $f_1(x)$ and the higher power mode $f_2(x)$. Thus, for observations 122 and 129, the lower power mode may be used reliably. By contrast, observations in the area of uncertainty 130 have model output magnitudes near the classification boundary line 102, and their classifications results vary in sign depending on where they fall in the uncertainty range (as depicted by the circular uncertainty ranges intersecting the classification boundary line 102); thus, the higher power mode $f_2(x)$ can be used for these observations to improve classification certainty.

The power savings provided by multimode inferencing, such as described in this example, may be estimated based on the number of total observations (or inputs). For example, assuming a number of observations N, of which N' are "difficult" observations (e.g., falling within an area of uncertainty (e.g., 130 in FIG. 1C), then the error rate of the lower power inference mode is $$\text{approximately} = \frac{N'}{N} \ll 1.$$

Accordingly, energy consumption can be saved if $$\frac{V_l}{V_h} < 1 - \varepsilon,$$

where $V_l$ is a voltage applied to the processing hardware for low-power inferencing, and $V_h$ is a voltage applied to the processing hardware for high-power inferencing. Thus, the following comparison showing the efficiency benefits can be derived as:

TABLE 1

| | Conventional Inference | Dual Power Mode Inference |
|---|---|---|
| Average Power Consumption (Proportional) | $V_h^2$ | $V_l^2 + \varepsilon V_h^2$ |
| Average Latency (Proportional) | T | $(1 + \varepsilon)T$ |

Note that Table 1 is just one example showing benefits with two processing power modes, and other examples are possible with more than two processing power modes.

Example Method for Performing Multimode Inferencing

Figure 2:
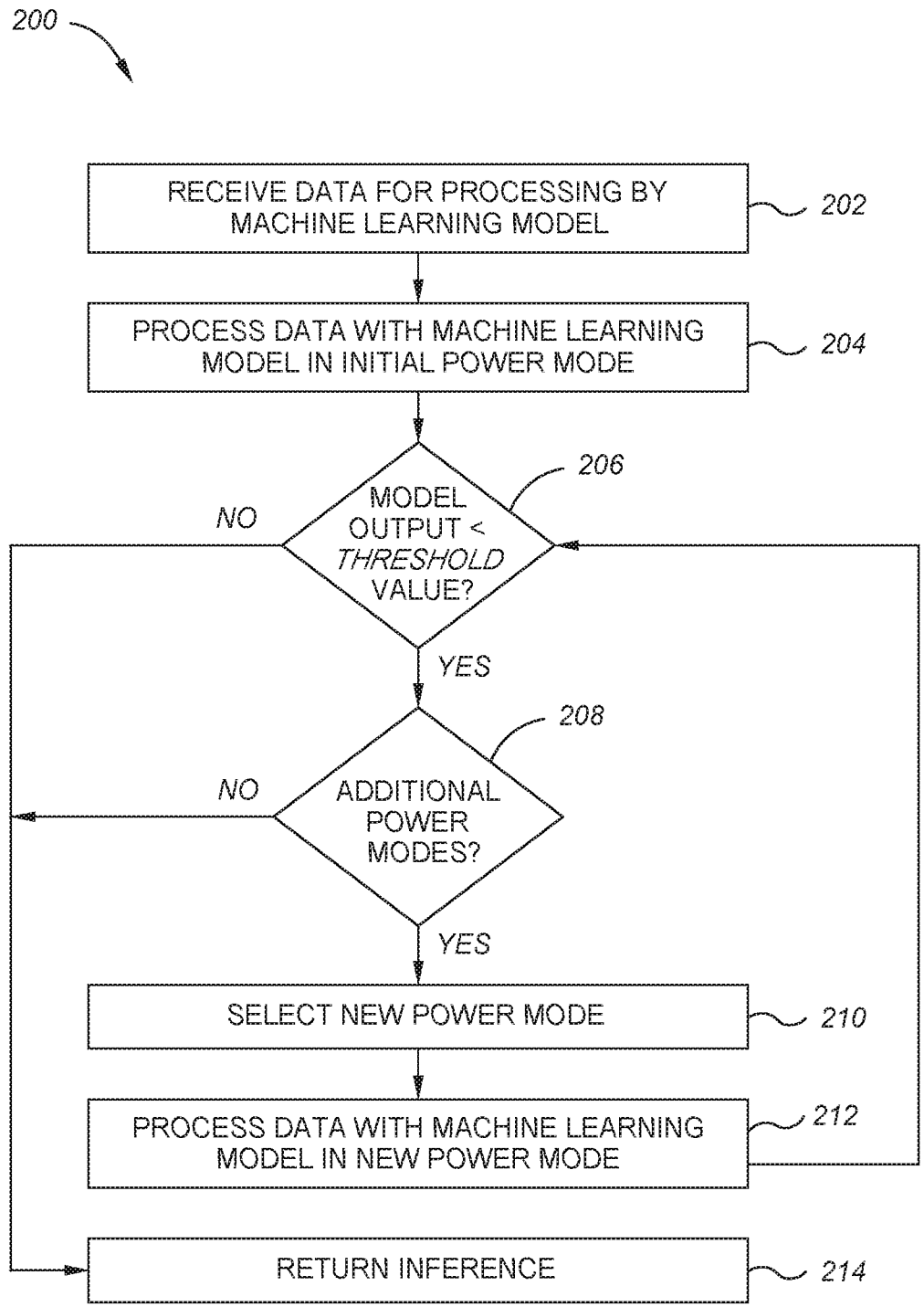
FIG. 2 depicts an example method for performing multimode inferencing.

FIG. 2 depicts an example method 200 for performing multimode inferencing.

Method 200 begins at step 202 with receiving data for processing by a machine learning model. The data may generally comprise filters, feature maps, model parameters, and the like, and the data may be formatted as, for example, a tensor, a matrix, a vector, or any other suitable data format. The data may further include a plurality of observations that may be processed sequentially or in parallel when the data processing task is performed by a processing system capable of parallel processing.

The machine learning model may be any sort of machine learning model, such as linear regression, logistic regression, decision tree, support vector machine, clustering (e.g., k-Means), random forest, gradient boost, neural network (e.g., deep neural networks), and others. For example, the machine learning model may be a classification model trained with a machine learning algorithm, such as in the example described above with respect to FIGS. 1A-1D.

Method 200 then proceeds to step 204 with processing the data by the machine learning model in an initial power mode to generate model output data. For example, the model output data may be a value, such as a probability of a classification, or a set of values associated with multiple classifications, and the like.

The initial power mode may be one of a plurality of available power modes for the processing hardware that processes the data with the machine learning model. In some embodiments, configuration details associated with the plurality of available power modes may be stored in a memory and accessible to a power controller, which may select a power mode and implement the associated configurations, such as described in more detail below with respect to FIG. 3. The configuration details may include, for example, an absolute or relative voltage to apply to circuitry in the processing hardware responsible for processing the received data. In some embodiments, the available power modes may be stored as an ordered list so that each power mode may be selected sequentially with a pointer increment.

In some embodiments, the processing hardware may include one or more of a dedicated machine learning task accelerator (e.g., an inference accelerator), or another type of processing unit, such as a central processing unit (CPU), graphics processing unit (GPU), a tensor processing unit (TPU), or any other sort of processing hardware configured for machine learning tasks.

Method 200 then proceeds to step 206 with comparing the model output to a threshold value, such as an confidence threshold. In some embodiments, a magnitude of the model output may be compared to the threshold value, as described in more detail below. In some embodiments, a function like Softmax may be applied to the model output, such as in the case of a multi-class neural network output, which is also described in more detail below.

In some embodiments, the uncertainty value may be a value associated with the model that is set based on experimentation, while in other embodiments the uncertainty value may be a parameter obtained during training of the machine learning model.

If at step 206 the model output is greater than or equal to the threshold value, then method 200 proceeds to step 214 with returning an inference based on the model output.

In some embodiments, the inference at step 214 may be the model output, such as a numerical value. In other embodiments, the inference may be a categorical value (e.g., a classification) based on the model output, such as the positive or negative classifications described above in the example of FIGS. 1A-1D. In other embodiments, the inference at step 214 may be a series of numerical values from, for example, an output layer of a neural network model, or a series of categorical classifications based on the series of numerical values. Notably, these are just a few examples and others are possible.

If at step 206 the model output is below the threshold value, then the method proceeds to step 208 where a determination is made as to whether any additional power modes are available for the model.

If at step 208 there are no additional power modes, then method 200 proceeds to step 214 with returning an inference, such as described above.

If at step 208 there are additional power modes available for the model, then method 200 proceeds to step 210 with selecting a new power mode. The new power mode in this example is a higher power mode than the initial power mode.

As above, the new power mode may be selected from a set of available power modes stored in a memory accessible to the processing system. In some embodiments, there may be only two power modes (e.g., a low power mode and a high power mode), while in other embodiments, there may be more than two power modes. A suitable controller may then implement the power mode by, for example, changing a voltage applied to circuitry of the processing hardware performing the data processing. The circuitry may include digital and/or analog processing circuitry.

From step 210, method 200 proceeds to step 212 with processing the data with the machine learning model in the new power mode.

In some embodiments, the new power mode is a higher power mode, such as the next higher power mode where a plurality of additional power modes are available. The higher power mode generally improves the performance of the machine learning model, such as the accuracy of the model output, by, for example, reducing non-idealities of a processing system implementation.

After processing the data in the new power mode at step 212, method 200 returns to step 206 and proceeds as described above.

Though not explicitly depicted in FIG. 2, method 200 may be repeated so long as additional data is available for processing. For example, if more data is available for processing, method 200 may return to step 202 if the data is not already received, or to step 204 if the data is already received and awaiting processing (e.g., stored in a buffer). Method 200 may thus be repeatedly performed for new machine learning model input data.

As above, method 200 may be implemented with various types of machine learning models. For example, in the case of a binary classification model, such as described above with respect to FIGS. 1A-1D, step 204 may be performed using a model in an initial power mode $f_p(x)$ where $p=1$ is the initial and lowest power model. Then at step 206, a magnitude of the model output may be compared to the confidence threshold according to $|f_p(x)| < \eta$, where $\eta$ is the confidence threshold, x is the data received at step 202, and $|f_p(x)|$ gives the magnitude of the model output value as determined by an absolute value operation in this example. If at step 206 the magnitude of the model output is greater than or equal to the threshold, i.e., if $|f_p(x)| \geq \eta$, then method 200 proceeds to step 214 where an inference y based on the model output is returned, which in this example is a sign of the output according to $y=\text{sign}(f_p(x))$. If at step 206 the magnitude of the model output is less than the threshold, i.e., $|f_p(x)| < \eta$, then a higher power mode is selected at step 210 (if available per step 208) and the data is processed by the model in the higher power mode according to $f_{p+1}(x)$, where p+1 is the next highest available power mode. Depending on the model output value, the process may be repeated for some or all possible power modes, e.g., $f_1(x) \ldots f_n(x)$, where there are n total power modes (i.e., $p \in \{1 \ldots n\}$). Notably, in this example, the "equal to" threshold condition may apply in either direction, such as $|f_p(x)| < \eta$ or $|f_p(x)| \leq \eta$ depending on design preferences.

As another example, in the case of a neural network classification model, an output value of a particular node in the output layer may be calculated according to an activation function like Softmax $$\left( \sigma(z)_i = \frac{\exp(z_i)}{\sum_{j=1}^{K} \exp(z_j)} \right),$$

or other activation functions like ReLU, Sigmoid, etc., and a classification may be chosen according to $$\hat{y} = \underset{i}{\arg\max}\, \sigma(z)_i.$$

Here, an argmax function is used to choose the most probable class rather than the maximum probability itself. Thus, step 204 may be performed using a model in an initial power mode $\sigma_p(z)_i$, where p=1 is the initial and lowest power model setting and $p \in \{1 \ldots n\}$, $z=\Sigma_i w_i x_i$, and x is the data received at step 202. Then at step 206, a maximum of the neural network model outputs (e.g., from a final layer of the model) may be compared to the confidence threshold according to max $\sigma_p(z)_{i_{max}} > \eta$, where $\eta$ is the confidence threshold and where $i_{max}$ is an index for a final layer of the neural network model. In some embodiments, $\eta$ may be in a range of 0.6-0.8. If at step 206 the maximum model output is greater than or equal to the threshold, i.e., max $\sigma_p(z)_{i_{max}} \geq \eta$, then method 200 proceeds to step 214 where an inference based on the model output is returned, which in this example is according to $$y = \underset{i_{max}}{\arg\max}\, \sigma_p(z)_{i_{max}}.$$

If at a step 206 the maximum model output is less than the threshold, i.e., max $\sigma_p(z)_{i_{max}} < \eta$, then a higher power mode is selected at step 210 (if available per step 208) and the data is processed by the model in the higher power mode according to $\sigma_{p+1}(z)_i$. As above, the process may be repeated for some or all possible power modes, e.g., $\sigma_1(z)_i \ldots \sigma_n(z)_i$, where there are n total power modes.

Notably, this is just one example implementation for a neural network model, and others are possible. For example, max $\sigma_p(z)_i \geq \eta$ at step 206 could be replaced by the difference of Softmax outputs of the first candidate (the maximum) and the second candidate (second maximum), for example according to $$\max_{i \in \{1, \ldots, K\}} \sigma(z)_i - \max_{i \in \{1, \ldots, K\} \setminus i_{max}} \sigma(z)_i,$$

where $$i_{max} = \underset{i \in \{1, \ldots, K\}}{\arg\max}\, \sigma(z)_i,$$

K denotes the number of classes (the number of output layer's nodes), and "\" denotes set minus (or set difference)).

Example Machine Learning Model Processor Implementing Multimode Inferencing

Figure 3:
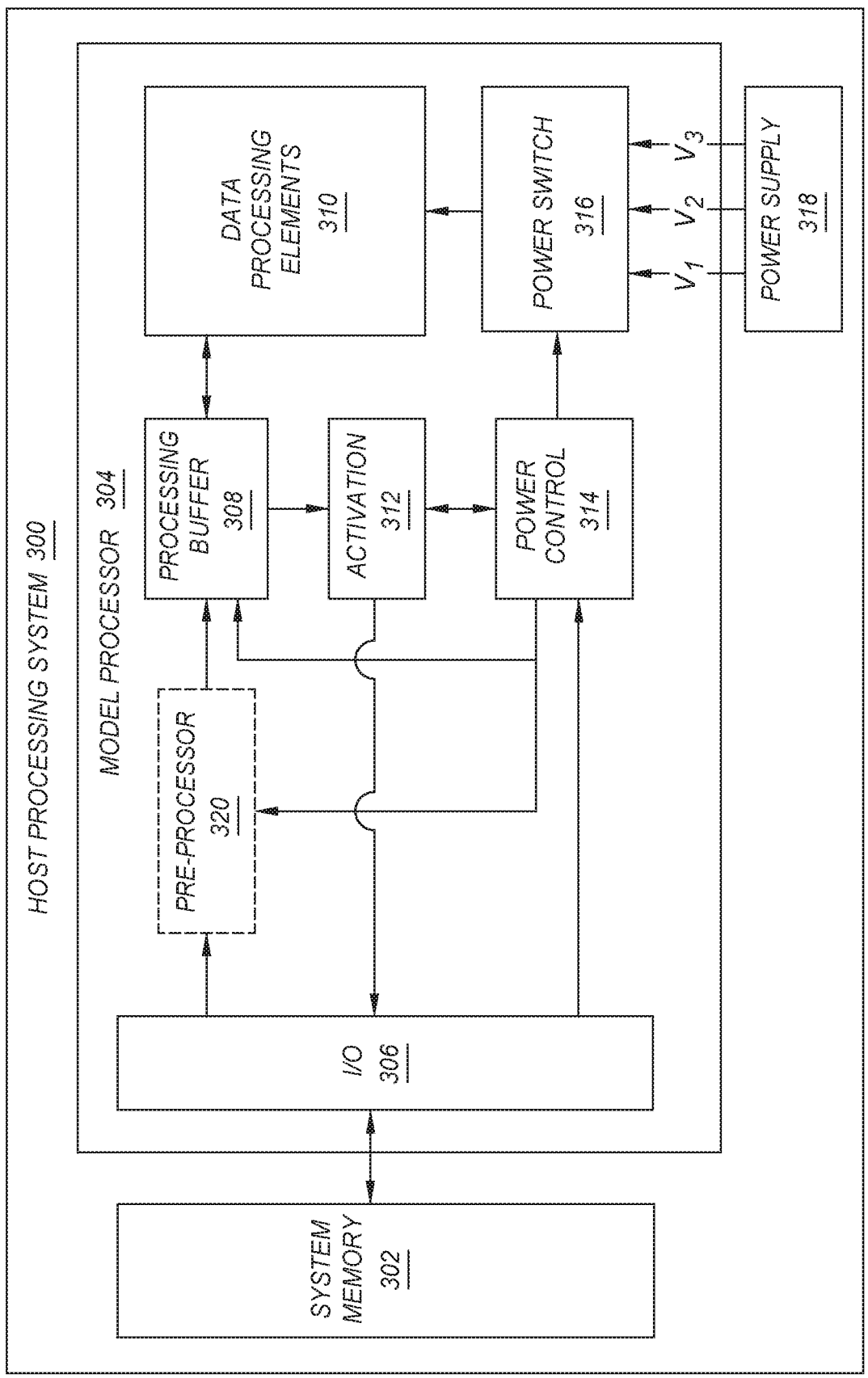
FIG. 3 depicts an example of a machine learning model processor configured for multimode inferencing.

FIG. 3 depicts an example of a machine learning model processor 304 configured for multimode inferencing.

In some embodiments, machine learning model processor 304 may be a dedicated machine learning task accelerator (e.g., an inference accelerator), or part of another type of processing unit, such as a central processing unit (CPU), graphics processing unit (GPU), a tensor processing unit (TPU), or the like, which is configured to work with host processing system 300.

For example, machine learning model processor 304 may be an accelerator card installed within a server, workstation, or a desktop computer, or machine learning model processor 304 may be an accelerator module or system on a chip (SoC) installed within a mobile device, an edge processing device, or the like. Note that while shown as a part of host processing system 300 in this example, model processor 304 may be remote from host processing system 300 in other embodiments, and may interact via a network connection, such as in a cloud processing service.

Machine learning model input data, such as filters, feature maps, model parameters, and the like may be received at model processor 304 by way of system memory 302. In some embodiments, the machine learning model input data may be received from a data processing requestor, such as an application operating on host processing system 300, or remote from but otherwise in data communication with host processing system 300.

Though not depicted in FIG. 3, in some embodiments, input/output component 306 may include various drivers, encoders, and decoders for receiving and transmitting the machine learning model data to and from a host processing system.

In some embodiments, machine learning model input data is pre-processed by a pre-processor 320. For example, pre-processing may include feature (or dimensionality) reduction or data quantization, as described further below. Other embodiments may not include pre-processor 320, or pre-processing may be performed by other elements of host processing system 300.

Machine learning model input data is buffered by processing buffer 308 and then processed by data processing elements 310.

In some embodiments, each data processing element (e.g., in an array of data processing elements) includes a multiply and accumulate sub-element, a local memory sub-element, a control sub-element, and data connections to one or more other processing elements. In this example, data processing elements 310 are configured to perform processing associated with a machine learning model, such as evaluating a model function (e.g., as described above with respect to FIGS. 1A-1D), processing a neural network model, or the like. Processed machine learning model output data is likewise buffered by processing buffer 308 in this example.

Machine learning model input data may initially be processed by data processing elements 310 according to a first power mode, such as using a first voltage ($V_1$) provided by power supply 318 and selected by power switch 316 under control of power control component 314.

Processed machine learning model output data is provided to activation block 312 by way of processing buffer 308 in this example. Activation block 312 is configured to apply an activation function to the machine learning model output data to generate activation data. Activation block 312 may implement various types of activation functions, such as an identify function, threshold function, ReLU, Parametric ReLU, Leaky ReLU, Randomized Leaky ReLU, Tan H, Sigmoid, Softmax, Maxout, and others.

The activation data generated by activation component 312 is provided to power control component 314, which may implement a logic function to compare the activation data against a threshold, such as described above with respect to FIG. 2. In some embodiments, the activation data includes activation outputs of the last layer of a model processed by data processing elements 310.

For example, if the activation data is less than a threshold value, then power control component 314 may instruct activation component 312 to discard the activation data rather than sending it back to the host processing system 300 via I/O component 306 and system memory 302. Further, power control component 314 may instruct power switch 316 to select another power mode, such as moving from a first voltage $V_1$ to a second Voltage $V_2$, where $V_2 > V_1$. Finally, power control component 314 may instruct processing buffer 308 to re-process the machine learning input data using data processing elements 310, which are now operating at a higher power (e.g., $V_2$ instead of $V_1$).

If the activation data is greater than or equal to the threshold, then power control component 314 may instruct activation component 312 to send the activation data to the host processing system 300 via I/O component 306 and system memory 302. If the power switch has selected a higher power mode, such as $V_2$ or $V_3$, then power control component 314 may further instruct power switch 316 to return to an initial power mode, such as $V_1$. Finally, power control component 314 may instruct processing buffer to clear the machine learning input data and receive new data from the host processing system via, for example, I/O component 306 and system memory 302.

In some embodiments, power control component 314 may include a memory comprising configuration data for multiple power modes for the machine learning model being processed by model processor 304. In some embodiments, that configuration data may be received along with the machine learning model data via I/O component 306.

Notably, the configuration and components of model processor 304 are just one example, and many designs are possible consistent with the methods described herein.

Selective Quantization of Input Data Based on Processing Power Mode

In some embodiments, machine learning model input data may be quantized based on the selected processing power mode (e.g., for inferencing). For example, in an initial, lower power mode (e.g., $V_1$), the machine learning model input data may be quantized prior to processing to save further power during processing.

In some embodiments, model processor 304 thus includes pre-processor component 320, which may be configured to quantize the machine learning model input data before buffering it for processing in processing buffer 308. Pre-processor component 320 may be controlled by power control component 314, which may selective enable or disable pre-processing of machine learning model input data, such as by quantization, based on the selected power mode.

For example, an initial power mode for inferencing may be configured to use the lowest power, $V_1$, available from power supply 318 and to enable data quantization by pre-processor component 320. However, higher power modes may disable data quantization and use higher power settings, such as $V_2$ or $V_3$, to improve model performance.

Example Method of Performing Multimode Inferencing

Figure 4:
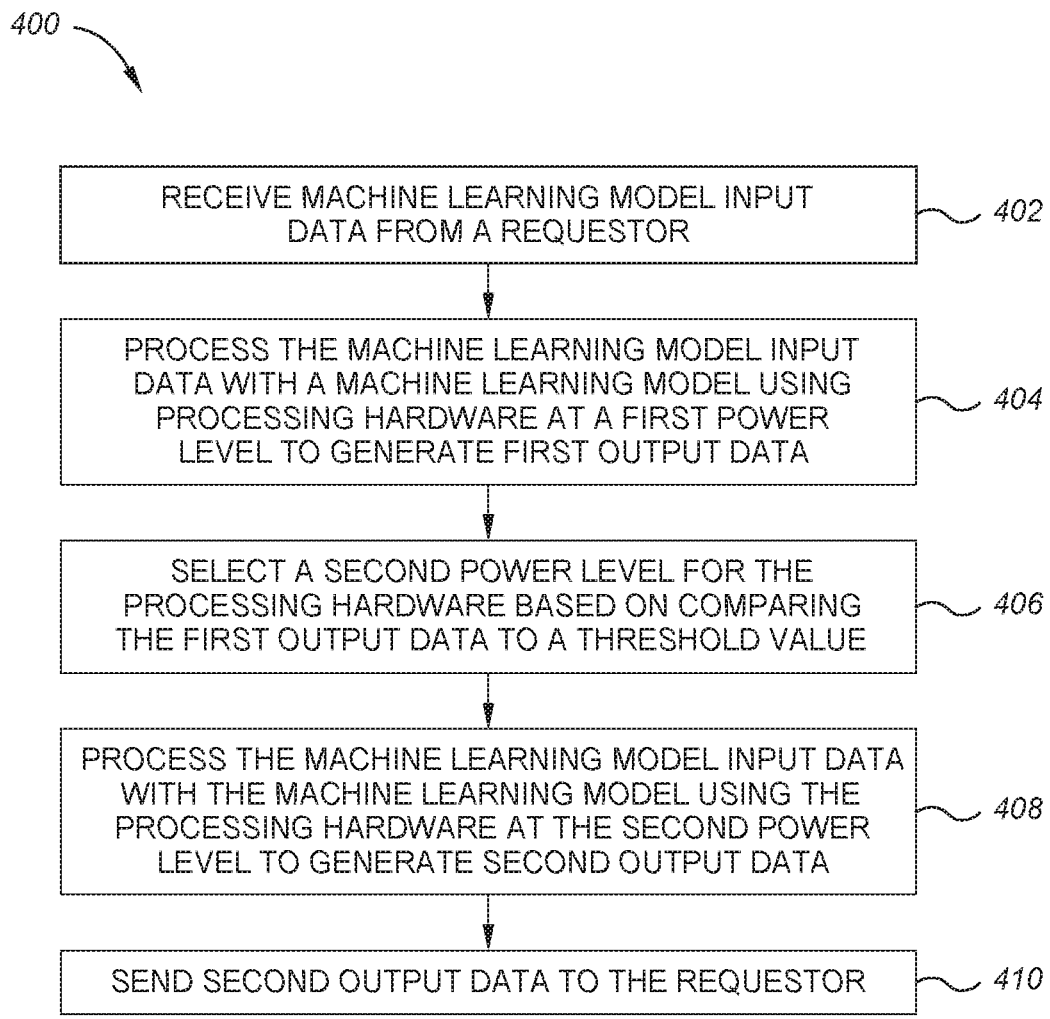
FIG. 4 depicts another example method for performing multimode inferencing.

FIG. 4 depicts another example method 400 for performing multimode inferencing.

Method 400 beings at step 402 with receiving machine learning model input data from a requestor. For example, the requestor may be an application running on a host processing system, such as described above with respect to FIG. 3.

Method 400 then proceeds to step 404 with processing the machine learning model input data with a machine learning model using processing hardware at a first power level to generate first output data. In some embodiments, the processing hardware comprises an array of processing elements in an inference accelerator, such as described above with respect to FIG. 3.

In some embodiments, the first power level comprises a first voltage applied to the processing hardware, such as described above with respect to FIG. 3.

Method 400 then proceeds to step 406 with selecting a second power level for the processing hardware based on comparing the first output data to a threshold value.

In some embodiments, the second power level comprises a second voltage applied to the processing hardware, and the second voltage is higher than the first voltage, such as described above with respect to FIG. 3.

Method 400 then proceeds to step 408 with processing the machine learning model input data with the machine learning model using the processing hardware at the second power level to generate second output data.

Method 400 then proceeds to step 410 with sending second output data to the requestor.

Though not depicted in FIG. 4, some embodiments of method 400 may further include determining that a value of the first output data is less than the threshold value, which may cause the selection of a second power level at step 406. Method 400 may further include determining that a value of the second output data is greater than or equal to the threshold value, which may cause the sending of the second output data (rather than selecting a further power level, if available) at step 410.

Some embodiments of method 400 may further include selecting the first power level for the processing hardware based on a first power mode associated with the machine learning model; and selecting the second power level for the processing hardware based on a second power mode associated with the machine learning model.

Some embodiments of method 400 may further include quantizing the machine learning model input data according to a first power mode associated with the machine learning model.

In some embodiments of method 400, the machine learning model comprises a linear classification model, and comparing the first output data to a threshold value comprises comparing a magnitude of an output of the linear classification model to the threshold value $\eta$ according to $|f(x)|<\eta$, such as described above with respect to FIG. 2.

In some embodiments of method 400, the machine learning model comprises a neural network model, and comparing the first output data to a threshold value comprises comparing a maximum value of an activation function $\sigma$ for the neural network model to the threshold value $\eta$ according to: max $\sigma(z)_i > \eta$, such as described above with respect to FIG. 2.

In some embodiments of method 400, the machine learning model comprises a neural network model, and comparing the first output data to a threshold value comprises comparing a difference of Softmax outputs for a first maximum candidate and a second maximum candidate to the threshold value.

Some embodiments of method 400 may further include incrementing a counter value after selecting the second power level for the processing hardware; and increasing the threshold value based on comparing the counter value to a counter threshold value, such as described below with respect to FIG. 5.

Example Method of Adjusting a Power Mode Threshold During Multimode Inferencing

A situation may arise in which the threshold value used to determine whether a machine learning model needs to reprocess model input data at a different power level needs to be adjusted after an initial implementation. As above, this threshold may generally be determined through experimentation and set such that the ratio of low-power inferences to higher-power inferences maintains a net power savings for the overall inferencing process. However, if model input data drifts over time as compared to the data used to train the machine learning model, the threshold may need adjusting until the model can be retrained. Adjusting the threshold value may ensure using multimode inferencing continues to net power savings for aggregate inferencing operations.

Figure 5:
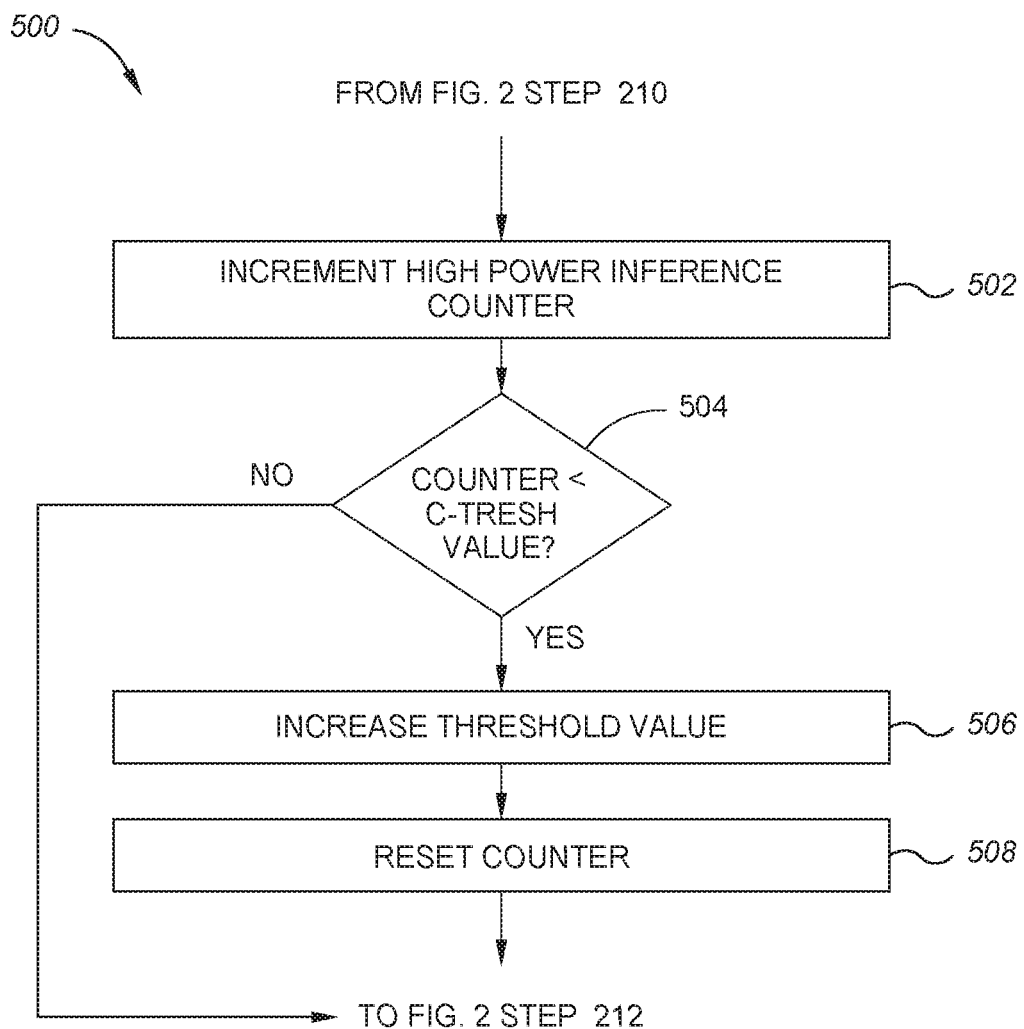
FIG. 5 depicts an example method for adjusting a power mode threshold during multimode inferencing.

FIG. 5 depicts an example method 500 for adjusting a power mode threshold during multimode inferencing. As depicted, method 500 may be implemented as an optional addition to method 200 of FIG. 2. Similarly, the steps in method 500 may be integrated with method 400 described above with respect to FIG. 4.

In this example, method 500 begins after a power mode is incremented in step 210 of FIG. 2 at step 502 with incrementing a high-power inference counter. In this example, high-power inference includes any inference performed at a power level higher than the initial power level.

Method 500 then proceeds to step 504 where the counter value is compared to a counter threshold value. If at step 504 the counter value is less than a counter threshold value, then method 500 returns to step 212 of method 200.

If at step 504 the counter values is greater than or equal to the counter threshold value, then method 500 proceeds to step 506 with increasing the threshold value used in step 206 of method 200 (i.e., the threshold value that is compared to the model output).

Method 500 then proceeds to step 508 with resetting the counter. Method 500 then returns to step 212 of method 200.

Note that while not depicted in FIG. 5, the counter value may also be reset after a predetermined number of inferences, or after a predetermined time interval, so as to avoid always reaching the counter threshold value after a large number of inferences and adjusting the threshold value unnecessarily. For example, the counter threshold value may be based on a predetermined number of inferences and the counter may be reset after that predetermined number of inferences.

Example Processing System

Figure 6:
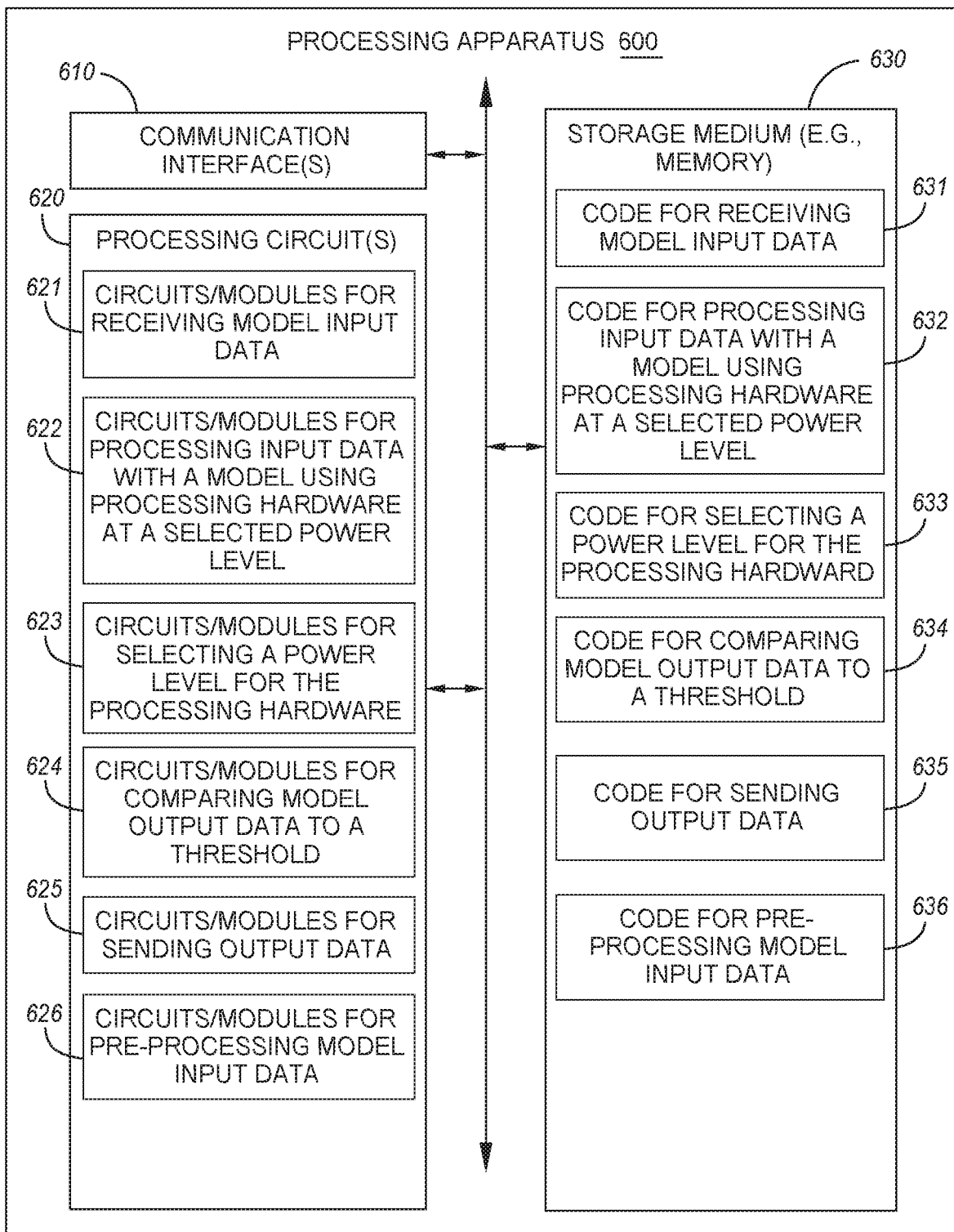
FIG. 6 depicts an example processing system.

FIG. 6 depicts an example processing system 600, which may be configured to perform the various aspects described herein, including the methods described with respect to FIGS. 4 and 5.

Processing system 600, or components thereof, could embody or be implemented within a server computer, desktop computer, workstation, tablet computer, smartphone, smart wearable device, internet of things (IoT) device, edge processing device, personal digital assistant, digital camera, digital phone, entertainment device, medical device, self-driving vehicle control device, data storage device, controller device, host device, or some other type of device that processes data.

Processing system 600 includes a communication interface(s) 610, processing circuit(s) 620 (e.g., at least one processor and/or other suitable circuitry), and storage medium 630 (e.g., a non-volatile memory). These components can be coupled to and/or placed in electrical communication with one another via a signaling bus or other suitable component, represented generally by the connection lines in FIG. 6. The signaling bus may include any number of interconnecting buses and bridges depending on the specific application of the processing circuit(s) 620 and the overall design constraints. The signaling bus links together various elements such that each of the communication interface 610, the processing circuit(s) 620, and the storage medium 630 are coupled to and/or in electrical communication with each other. The signaling bus may also link various other circuits (not shown) such as timing sources, peripherals, voltage regulators, and power management circuits, which are well known in the art, and therefore, will not be described any further.

The communication interface 610 provides a means for communicating with other devices or apparatuses over a transmission medium. In some implementations, the communication interface 610 includes circuitry and/or programming (e.g., a program) adapted to facilitate the communication of information bi-directionally with respect to one or more devices in a system. In some implementations, the communication interface 610 may be configured for wire-based communication. For example, the communication interface 610 could be a bus interface, a send/receive interface, or some other type of signal interface including drivers, buffers, or other circuitry for outputting and/or obtaining signals (e.g., outputting signal from and/or receiving signals into an integrated circuit). The communication interface 610 serves as one example of a means for receiving and/or a means for transmitting.

The storage medium 630 may represent one or more computer-readable, machine-readable, and/or processor-readable devices for storing programming, such as processor executable code or instructions (e.g., software, firmware), electronic data, databases, or other digital information. The storage medium 630 may also be used for storing data that is manipulated by the processing circuit(s) 620 when executing programming. The storage medium 630 may be any available media that can be accessed by a general purpose or special purpose processor, including portable or fixed storage devices, optical storage devices, and various other mediums capable of storing, containing or carrying programming.

By way of example and not limitation, the storage medium 630 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a RAM, ROM, PROM, EPROM, an EEPROM, ReRAM, a register, a removable disk, and any other suitable medium for storing software and/or instructions that may be accessed and read by a computer. The storage medium 630 may be embodied in an article of manufacture (e.g., a computer program product). By way of example, a computer program product may include a computer-readable medium in packaging materials. In view of the above, in some implementations, the storage medium 630 may be a non-transitory (e.g., tangible) storage medium. For example, the storage medium 630 may be a non-transitory computer-readable medium storing computer-executable code, including code to perform operations as described herein.

The storage medium 630 may be coupled to the processing circuit(s) 620 so that the processing circuit 620 can read information from, and write information to, the storage medium 630. That is, the storage medium 630 can be coupled to the processing circuit(s) 620 so that the storage medium 630 is at least accessible by the processing circuit(s) 620, including examples where at least one storage medium is integral to the processing circuit(s) 620 and/or examples where at least one storage medium is separate from the processing circuit(s) 620 (e.g., resident in the apparatus 600, external to the apparatus 600, distributed across multiple entities, etc.).

Programming stored by the storage medium 630, when executed by the processing circuit(s) 620, causes the processing circuit(s) 620 to perform one or more of the various functions and/or process operations described herein. For example, the storage medium 630 may include operations configured for regulating operations at one or more hardware blocks of the processing circuit(s) 620, as well as to utilize the communication interface(s) 610 for wireless communication utilizing their respective communication protocols.

At least some of the processing circuits described herein are generally adapted for processing, including the execution of such programming stored on a storage medium such as storage medium 630. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

At least some of the processing circuits described herein are arranged to obtain, process and/or send data, control data access and storage, issue commands, and control other desired operations. For example, the processing circuits may include circuitry configured to implement desired programming provided by appropriate media in at least one example.

For example, the processing circuits may be implemented as one or more processors, one or more controllers, and/or other structure configured to execute executable programming. Examples of processing circuits may include a general purpose processor, a digital signal processor (DSP), an ASIC, a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuits may also be implemented as a combination of computing components, such as a combination of a controller and a microprocessor, a number of microprocessors, one or more microprocessors in conjunction with an ASIC and a microprocessor, or any other number of varying configurations. These examples of processing circuits are for illustration and other suitable configurations within the scope of the disclosure are also contemplated.

According to one or more aspects of the disclosure, the processing circuit(s) 620 may be adapted to perform any or all of the features, processes, functions, operations and/or routines for any or all of the controller apparatuses described herein. For example, the processing circuit(s) 620 may be configured to perform any of the steps, functions, and/or processes described with respect to FIGS. 1-5. As used herein, the term "adapted" in relation to the processing circuit(s) 620 may refer to the processing circuit(s) 620 being one or more of configured, employed, implemented, and/or programmed to perform a particular process, function, operation and/or routine according to various features described herein. The processing circuit(s) 620 may be a specialized processor, such as an ASIC that serves as a means for (e.g., structure for) carrying out any one of the operations described in conjunction with FIGS. 1-5. The processing circuit(s) 620 serves as one example of a means for processing. In various implementations, the processing circuit(s) 620 may provide and/or incorporate, at least in part, the functionality described above for the model processor 304 of FIG. 3.

According to at least one example of the apparatus 600, the processing circuit(s) 620 may include one or more of: a circuit/module 621 for receiving machine learning model input data; a circuit/module 622 for processing the machine learning model input data with a machine learning model using processing hardware at a selected power level to generate output data; a circuit/module 623 for selecting a power level for the processing hardware; a circuit/module 624 for comparing model output data to a threshold; a circuit/module 625 for sending second output data to the requestor; and a circuit/module 626 for pre-processing model input data. Notably, these are just some examples, and others are possible based on the various aspects described herein.

As mentioned above, a program stored by the storage medium 630, when executed by the processing circuit(s) 620, causes the processing circuit(s) 620 to perform one or more of the various functions and/or process operations described herein. For example, the program may cause the processing circuit(s) 620 to perform and/or control the various functions, steps, and/or processes described herein with respect to FIGS. 1-5.

As shown in FIG. 6, the storage medium 630 may include one or more of: code 631 for receiving machine learning model input data; code 632 for processing the machine learning model input data with a machine learning model using processing hardware at a selected power level to generate output data; code 633 for selecting a power level for the processing hardware; code 634 for comparing model output data to a threshold; code 635 for sending second output data to the requestor; and code 636 for pre-processing model input data. Notably, these are just some examples, and others are possible based on the various aspects described herein.

In at least some examples, the various circuits/modules in 620 as well as other processing elements described herein may comprise means for performing the various functions described herein, including the functions enabled by the various codes stored in storage medium 630.

Additional Aspects

The examples set forth herein are provided to illustrate certain concepts of the disclosure. The apparatus, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatus, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terminology used herein is for the purpose of describing particular aspects only and is not intended to be limiting of the aspects. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of A, B, or C" or "A, B, C, or any combination thereof" or "one or more of A, B, and C" used in the description or the claims means "A or B or C or any combination of these elements." For example, this terminology may include A, or B, or C, or A and B, or A and C, or A and B and C, or 2A, or 2B, or 2C, or 2A and B, and so on. As a further example, "one or more of: A, B, or C" is intended to cover A, B, C, A-B, A-C, B-C, and A-B-C, as well as multiples of the same members (e.g., any lists that include AA, BB, or CC). Likewise, "one or more of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A method for performing multimode inferencing, comprising:
    receiving machine learning model input data from a requestor;
    processing the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
    enabling data quantization by a pre-processor after selecting the first power level;
    selecting the second power level for the processing hardware based on comparing the first output data to a threshold value;
    disabling data quantization by the pre-processor after selecting the second power level;
    processing the machine learning model input data with the machine learning model using the processing hardware at the second power level to generate second output data; and
    sending second output data to the requestor.

2. The method of claim 1, further comprising:
    determining that a value of the first output data is less than the threshold value; and
    determining that a value of the second output data is greater than or equal to the threshold value.

3. The method of claim 1, wherein:
    the first power level comprises a first voltage applied to the processing hardware,
    the second power level comprises a second voltage applied to the processing hardware, and
    the second voltage is higher than the first voltage.

4. The method of claim 1, further comprising:
    selecting the first power level for the processing hardware based on a first power mode associated with the machine learning model; and
    selecting the second power level for the processing hardware based on a second power mode associated with the machine learning model.

5. The method of claim 1, further comprising: quantizing the machine learning model input data according to a first power mode associated with the machine learning model.

6. The method of claim 1, wherein:
    the machine learning model comprises a linear classification model, and
    comparing the first output data to a threshold value comprises comparing a magnitude of an output of the linear classification model to the threshold value $\eta$ according to $|f(x)| < \eta$.

7. The method of claim 1, wherein the processing hardware comprises an array of processing elements in an inference accelerator.

8. A method for performing multimode inferencing, comprising:
    receiving machine learning model input data from a requestor;
    processing the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
selecting the second power level for the processing hardware based on comparing the first output data to a threshold value;
processing the machine learning model input data with the machine learning model using the processing hardware at the second power level to generate second output data; and
sending second output data to the requestor, wherein:
the machine learning model comprises a neural network model, and
comparing the first output data to a threshold value comprises comparing a maximum value of an activation function σ for the neural network model to the threshold value η according to: max $\sigma(z)_{i_{max}} > \eta$, where $i_{max}$ is an index for a final layer of the neural network model.

9. A method for performing multimode inferencing, comprising:
receiving machine learning model input data from a requestor;
processing the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
selecting the second power level for the processing hardware based on comparing the first output data to a threshold value;
processing the machine learning model input data with the machine learning model using the processing hardware at the second power level to generate second output data; and
sending second output data to the requestor, wherein:
the machine learning model comprises a neural network model, and
comparing the first output data to a threshold value comprises comparing a difference of Softmax outputs for a first maximum candidate and a second maximum candidate to the threshold value.

10. A method for performing multimode inferencing, comprising:
receiving machine learning model input data from a requestor;
processing the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
selecting the second power level for the processing hardware based on comparing the first output data to a threshold value;
processing the machine learning model input data with the machine learning model using the processing hardware at the second power level to generate second output data; and
sending second output data to the requestor, further comprising:
incrementing a counter value after selecting the second power level for the processing hardware; and
increasing the threshold value based on comparing the counter value to a counter threshold value.

11. A processing system for performing multimode inferencing, comprising:
a memory comprising computer-executable instructions;
one or more processors configured to execute the computer-executable instructions and cause the processing system to:
receive machine learning model input data from a requestor;
process the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
enable data quantization by a pre-processor after selecting the first power level;
select the second power level for the processing hardware based on comparing the first output data to a threshold value;
disable data quantization by the pre-processor after selecting the second power level;
process the machine learning model input data with the machine learning model using the processing hardware at the second power level to generate second output data; and
send second output data to the requestor.

12. The processing system of claim 11, wherein the one or more processors are further configured to cause the processing system to:
determine that a value of the first output data is less than the threshold value; and
determine that a value of the second output data is greater than or equal to the threshold value.

13. The processing system of claim 11, wherein:
the first power level comprises a first voltage applied to the processing hardware,
the second power level comprises a second voltage applied to the processing hardware, and
the second voltage is higher than the first voltage.

14. The processing system of claim 11, wherein the one or more processors are further configured to cause the processing system to:
select the first power level for the processing hardware based on a first power mode associated with the machine learning model; and
select the second power level for the processing hardware based on a second power mode associated with the machine learning model.

15. The processing system of claim 11, wherein the one or more processors are further configured to cause the processing system to: quantizing the machine learning model input data according to a first power mode associated with the machine learning model.

16. The processing system of claim 11, wherein:
the machine learning model comprises a linear classification model, and
in order to compare the first output data to a threshold value, the one or more processors are further configured to cause the processing system to compare a magnitude of an output of the linear classification model to the threshold value η according to $|f(x)| < \eta$.

17. A processing system for performing multimode inferencing, comprising:
a memory comprising computer-executable instructions;
one or more processors configured to execute the computer-executable instructions and cause the processing system to:
receive machine learning model input data from a requestor;
process the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
select the second power level for the processing hardware based on comparing the first output data to a threshold value;
process the machine learning model input data with the machine learning model using the processing hardware at the second power level to generate second output data; and
send second output data to the requestor, wherein:
the machine learning model comprises a neural network model, and
in order to compare the first output data to a threshold value, the one or more processors are further configured to cause the processing system to compare a maximum value of an activation function σ for the neural network model to the threshold value η according to: $\max \sigma(z)_{i_{max}} > \eta$, where $i_{max}$ is an index for a final layer of the neural network model.

18. A processing system for performing multimode inferencing, comprising:
a memory comprising computer-executable instructions;
one or more processors configured to execute the computer-executable instructions and cause the processing system to:
receive machine learning model input data from a requestor;
process the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
select the second power level for the processing hardware based on comparing the first output data to a threshold value;
process the machine learning model input data with the machine learning model using the processing hardware at the second power level to generate second output data; and
send second output data to the requestor, wherein:
the machine learning model comprises a neural network model, and
in order to compare the first output data to a threshold value, the one or more processors are further configured to cause the processing system to compare a difference of Softmax outputs for a first maximum candidate and a second maximum candidate to the threshold value.

19. A processing system for performing multimode inferencing, comprising:
a memory comprising computer-executable instructions;
one or more processors configured to execute the computer-executable instructions and cause the processing system to:
receive machine learning model input data from a requestor;
process the machine learning model input data with a machine learning model using processing hardware at a first power level to generate first output data, wherein the processing hardware comprises a processor operable at one of a plurality of power levels including the first power level and a second power level different from the first power level, each power level corresponding to a different performance level for the machine learning model;
select the second power level for the processing hardware based on comparing the first output data to a threshold value;
process the machine learning model input data with the machine learning model using the processing hardware at the second power level to generate second output data; and
send second output data to the requestor, wherein the one or more processors are further configured to cause the processing system to:
incrementing a counter value after selecting the second power level for the processing hardware; and
increasing the threshold value based on comparing the counter value to a counter threshold value.

20. A method for performing multimode inferencing, comprising:
receiving machine learning model input data from a requestor;
processing the machine learning model input data with a machine learning model using processing hardware at a first power level to generate first output data, wherein the machine learning model comprises a neural network model;
selecting a second power level for the processing hardware based on comparing the first output data to a threshold value, wherein comparing the first output data to a threshold value comprises at least one of:
comparing a maximum value of an activation function σ for the neural network model to the threshold value η according to: $\max \sigma(z)_{i_{max}} > \eta$, where $i_{max}$ is an index for a final layer of the neural network model; and
comparing a difference of Softmax outputs for a first maximum candidate and a second maximum candidate to the threshold value;
processing the machine learning model input data with the machine learning model using the processing hardware at the second power level to generate second output data; and
sending second output data to the requestor.

* * * * *